US006372277B1

(12) United States Patent
Admiraal et al.

(10) Patent No.: US 6,372,277 B1
(45) Date of Patent: *Apr. 16, 2002

(54) SWEET-STABLE SOFT DRINKS, CONCENTRATES AND SYRUPS WITH DIPEPTIDE SWEETENER AND FRUCTAN

(75) Inventors: Alida G. M. Admiraal; Maria M. A. Rooyakkers, both of Roosendaal; Annette C. Hoek, Kerkrade, all of (NL)

(73) Assignee: Holland Sweetener Company V.O.F., Geleen (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/306,831

(22) Filed: May 7, 1999

Related U.S. Application Data

(63) Continuation of application No. PCT/NL97/00601, filed on Nov. 4, 1997.

(30) Foreign Application Priority Data

Nov. 7, 1996 (NL) .............................................. 1004464

(51) Int. Cl.[7] .............................................. A23L 1/236
(52) U.S. Cl. ......................... 426/548; 426/590; 426/658
(58) Field of Search ................................ 426/548, 590, 426/658

(56) References Cited

U.S. PATENT DOCUMENTS 4,970,889 A * 11/1990 Phillips et al.

5,169,671 A   12/1992  Harada et al. .............. 426/658

FOREIGN PATENT DOCUMENTS

DE         94 20 187.0      *  7/1995

OTHER PUBLICATIONS

Potter et al., Food Science Fifth Edition, Chapman & Hall, New York, 1995, p. 438 (Table 19.2), 1995.
Alexander, R.J., AN 436730 FROSTI, abstracting Food Product Design, 1997, Apr., 7(1), 75–98.1997.
Coussement, P., AN 96(07):T0022 FSTA, abstracting Deutsche Milchwirtschaft, 1995, 46(19), 1060–1062; 1995.
Wiedmann et al., AN 461937 FROSTI, abstracting Food Ingredients and Analysis International, 1997, Nov.–Dec., 19(6), 51–52 + 55–56.
Abstract of German Patent No. DE 19514274, dated Oct., 1996.*
Abstract of Gebrauchnuster 6 9420 187 U1, Jul. 1995.*

* cited by examiner

*Primary Examiner*—Leslie Wong
(74) *Attorney, Agent, or Firm*—Pillsbury Winthrop LLP

(57) ABSTRACT

The invention relates to soft drinks, concentrates and syrups sweetened with a dipeptide sweetener and containing a fructosyl saccharide. The sweetening power of these products is maintained for longer during storage if the fructosyl saccharide therein is a fructan with fructosyl units linked mainly via a β-2,1 bond, and a chain length of 3 to 100 units, with the modal and the mean chain length each being at least 4.75, and with the pH of the products being 2.5 to 4. The invention also relates to a method of maintaining the sweetening power of soft drinks, concentrates or syrups sweetened with a dipeptide sweetener, during storage, by adding a fructosyl saccharide with the abovementioned characteristics, before the products are put into storage, and adjusting the pH to between 2.5 and 4.

34 Claims, No Drawings

SWEET-STABLE SOFT DRINKS, CONCENTRATES AND SYRUPS WITH DIPEPTIDE SWEETENER AND FRUCTAN

This is a Continuation of International Appln. No. PCT/NL97/00601 filed Nov. 4, 1997.

The invention relates to soft drinks, concentrates and syrups sweetened with a dipeptide sweetener and containing a fructosyl saccharide. The invention also relates to a method of maintaining the sweetening power of soft drinks, concentrates or syrups, sweetened with a dipeptide sweetener, during storage.

The term "soft drinks, concentrates and syrups", as used in this application, includes carbonated and non-carbonated non-alcoholic drinks and concentrates thereof or syrups, including flavoured soft drinks, soft drinks with fruit and/or plant extracts, drinks containing tea extract, fruit nectars, soft drinks containing milk or milk-derived products, fruit lemonade syrups, lemonade syrups with plant extract and lemonade syrups with fruit flavour. Such soft drinks, concentrates and syrups generally have a pH lower than 7.

Soft drinks, concentrates and syrups sweetened with a dipeptide sweetener and containing a fructosyl saccharide are known from U.S. Pat. No. 4,978,751, which will be explained in greater detail below.

For the purposes of this application a dipeptide sweetener means a product which has a sweetening power many dozens of times stronger than that of sugar (sucrose), and which is constructed from amino acids or derivatives of amino acids linked via a peptide bond. The definition of dipeptide sweetener also encompasses all intensely sweet derivatives of a dipeptide sweetener, such as salts thereof with inorganic or organic acids. The best-known examples of dipeptide sweeteners are aspartame and alitame.

Aspartame ($\alpha$-L-aspartyl-L-phenylalanine methylester), hereinafter also referred to as APM, is a dipeptide sweetener with a sweetening power which is approximately 200× that of sucrose. Aspartame is used as an intense sweetener in many applications because of its good flavour properties and low-calorie characteristics. Aspartame is also widely used in soft drinks, concentrates and syrups.

Alitame, L-$\alpha$-aspartyl-N-(2,2,4,4-tetramethyl-3-thietanyl)-D-alanine amide hydrate, is a dipeptide sweetener with a sweetening power which is approximately 2000× that of sucrose. It is expected that alitame will also be widely used in soft drinks, concentrates and syrups in the future.

It should be noted here that even when the dipeptide sweeteners are used in the form of blends with other sweeteners, namely both with other intensive sweeteners (such as acesulfame-K, saccharin or cyclamate) and with carbohydrate sweeteners (such as fructose, sucrose (=saccharose), glucose syrups or so-called high fructose corn syrups ("HFCS")), these blends are considered to be included in the definition of dipeptide sweeteners for the purposes of the present patent application.

The term "fructosyl saccharide", as used at the beginning of this patent application, includes all trisaccharides or higher saccharides which contain one or more fructose units. Such saccharides have a degree of polymerization (also referred to as "DP" or as "chain length") greater than or equal to 3. Depending on their chain length, fructosyl saccharides can be subdivided into fructosyl oligosaccharides (i.e. fructosyl saccharides with a chain of up to 10 monosaccharides) and fructosyl polysaccharides (i.e. fructosyl saccharides with a chain consisting of 10 or more monosaccharides).

As has already been stated above, soft drinks, concentrates and syrups sweetened with a dipeptide sweetener and containing a fructosyl saccharide are known from U.S. Pat. No. 4,978,751. In the said patent certain fructosyl oligosaccharides are used as fructosyl saccharide, and aspartame is used as dipeptide sweetener. The fructosyl oligosaccharides used in U.S. Pat. No. 4,978,751 generally contain 3 to 8 carbohydrate units linked via $\beta$ bonds, with a terminal fructose molecule, and are intended as low-calorie substitutes for sugar in dietetic products. In particular, trisaccharides of the type glucose +sucrose (i.e. glucose-glucose-fructose), such as sophorofructose ($\beta$-1,2), laminaribiofructose ($\beta$-1,3), cellobiofructose ($\beta$-1,4) or gentiobiofructose ($\beta$-1,6), are recommended. The fructosyl oligosaccharides in question, which in fact might rather be thought of as glucosyl oligosaccharides with a terminal fructose unit, turn out to be very stable against enzymatic hydrolysis and have a sweet taste; they are therefore recommended as a low-calorie sweetener for use in dietetic products. In the said publication no mention is made of significant chemical hydrolysis of such products. Nor is any example given in the publication of the use of a combination of a fructosyl (oligo)-saccharide with aspartame in a soft drink, concentrate or syrup; only sorbets, pasta and ice cream products are manufactured.

It should also be noted that examples are known of squashes sweetened with dipeptide sweetener and fructose; in soft drinks obtained with such squashes, fructose makes a significant contribution to the sweetening power from the outset, apart from the effect on the flavour quality, partly because of the effect on the so-called "mouthfeel". Examples of such squashes are "Robinson's Whole Orange Drink Concentrate" and "Robinson's Apple & Blackcurrant Juice Drink" from Colman's, Norwich (UK), and "Amigo Blackcurrant Drink", from Batchelors Ltd., Dublin (Irish Republic). Soft drinks are also known in which, in addition to aspartame or alitame, syrups with a high fructose content are present, in particular the so-called "high fructose corn syrups". See for example EP-A-0301653, in which calcium-enriched drinks and concentrates of this type are described.

As is known from the chapter "Aspartame: implications for the food scientist", by B. E. Homler (in "Aspartame: Physiology and Biochemistry, Ed. L. D. Stegink and L. J Filer jr., Marcel Dekker Inc., New York, 1984, pp. 247–262), when dipeptide sweeteners such as aspartame (APM) are used in soft drinks, where because of the use of all kinds of buffer systems the pH is usually in the range from 2.5 to 4.5, there is slow breakdown of the dipeptide sweetener, and so the sweetness of the soft drink gradually decreases, with the result that the storage stability in terms of sweetness (the "sweetness shelf-life") is limited in practice. This is particularly the case with storage conditions where a temperature of 25° C. is exceeded, perhaps temporarily; the sweetness shelf-life may then be limited to a few months. The same thing obviously also applies to soft drinks, concentrates and syrups which are sweetened with dipeptide sweeteners and which also contain another sweetener, e.g. fructose, although their shelf-life (in terms of sweetening power) will improve with the presence of an increasing (and continuously present) concentration of the other sweetener, e.g. fructose, because then the relative effect of the loss of sweetening power by the dipeptide sweetener is less.

There is thus a need for soft drinks, concentrates and syrups sweetened with a dipeptide sweetener, and containing a fructosyl saccharide, in which the sweetness intensity remains stable for a longer time, e.g. at least three to six months at 20–25 ° C., and which thus have a good sweetness shelf-life.

Surprisingly it has now been found that soft drinks, concentrates and syrups sweetened with a dipeptide sweetener, e.g. aspartame, and containing a fructosyl saccharide, retain a stable or virtually stable level of sweetness for a much longer time than was previously usual if (a) the fructosyl saccharide is a fructan, with
  (1) the fructosyl units mainly being linked via a β-2,1 bond;
  (2) the chain length of the fructan being in the range from 3 to 100 units; and
  (3) the modal and the mean chain length each being at least 4.75; and
(b) the pH of the soft drink, concentrate or syrup is in the range from approximately 2.5 to approximately 4.0.

In this way the result is achieved that soft drinks, concentrates and syrups sweetened with a dipeptide sweetener and containing a fructosyl saccharide retain a virtually stable level of sweetness for a long time, e.g. 3 to 6 months at a temperature of 20–25° C., without there being any significant deterioration in other sensory properties during this period. This is very attractive commercially. It is assumed that the stable level of sweetening power is achieved by the decrease in sweetening power due to breakdown of the dipeptide sweetener being compensated for by the in situ formation of fructose and other sweet-tasting components as a result of more or less simultaneous breakdown of the fructan.

The collective name "fructans" refers to a large group of fructosyl saccharides, mostly fructosyl polysaccharides, in which there is a single terminal glucosyl unit in the majority of the chains. Fructans can also be subdivided into inulin-type fructans, i.e. products which have a relatively low degree of branching of the chains (where, generally, a side chain or side group is present on less than 20% of the monosaccharide units of the longest chain), and in which the bonds between the constituent fructosyl units are mainly β-2,1, and into levans. The latter category, levans, is characterized by a predominance of β-2,6 bonds. Where here and hereinafter the words "mainly β-2,1" are used, this means that at least 80% of the bonds between constituent fructosyl units are β-2,1 (or, in other words, are of the β-2,1 type). According to De Leenheer et al. (in Starch/Starke 46, pp. 193–196, 1994) the degree of branching is approximately 1 to 2% in chicory inulin and approximately 4 to 5% in dahlia inulin. Degree of branching can also be referred to as DB, which is expressed as a fraction.

Fructans occurring in nature can be regarded as a mixture of fructo-saccharide molecules in a particular range of chain lengths (DPs). For this reason, fructans are also often called polydisperse. Here and hereinafter "DP" means, as usual, the number of saccharide units (i.e. mainly fructosyl units) from which, in each case, the longest chain of such a fructosaccharide molecule is constructed. The distribution of chain lengths (or degrees of polymerization) in a fructan can be characterized by a mean and/or a modal value. The fructans can be further characterized according to the breadth of the distribution of chain lengths occurring therein, which in technical jargon is denoted by the term "chain length range" (or also "DP range"). The lower limit and the upper limit of the chain length range thus mean the number of monosaccharide units of the shortest and the longest chains present in the fructan, respectively. The chain length range of fructans can be very wide: it can range from 3 to more than 100, for example; the oligo- and polysaccharides present therein may also be linear or branched. There is usually a single terminal glucose residue at the end of the main chain and/or of one or more of the side chains. Fructans occur naturally as storage carbohydrates in a wide variety of plants, e.g. belonging to the families Compositae, Liliaceae and Cerealeae; products derived from such natural products by chemical or enzymatic modification, e.g. hydrolysates, are considered to be included under the general term "fructan". Fructans can also be obtained chemically or enzymatically from fructose and/or the disaccharide sucrose.

"Inulin-type fructans" means, for example, products such as native inulin (i.e. inulin obtained from chicory roots, for example; examples of such products available commercially are Frutafit®, from Sensus, a part of Coöperatie Cosun U.A., and Raftiline®, from de Tiense Suikerraffinaderij N.V.). Inulin can be thought of as a polydisperse, broadly distributed mixture of chain lengths of virtually linear fructose polymers, with one glucose unit, which is terminal, in almost every one of the chains. The solubility of the products decreases as the chain length increases. The chain length is also dependent on climatic factors and on the natural source (and its stage of development) from which the fructan, e.g. inulin, is obtained. Inulin from chicory roots grown in the Low Countries and harvested in September generally consists of chain lengths ranging from 3 to about 60, with a modal chain length of about 9. It is also possible, however, to obtain fractions with a narrower chain length distribution, and with a modal chain length very different from 9, from other source plants and/or by fractionation using physical processes. It will be clear that products derived from native inulin, such as partially hydrolysed inulin (e.g. of the Raftilose® type), or such as fructosyl (oligo)saccharides synthesized enzymatically or in some other way (also referred to as "fructo-oligos", e.g. of the Actilight® or Neosugar® type), are also included under the general term "fructans". None of the products of this type, however, turns out to be suitable for application in the soft drinks, concentrates and syrups according to the invention. Raftilose®, Actilight® and Neosugar® are registered brand names of de Tiense Suikerraffinaderij N.V., Eridania Beghin Say and Meiji Seika Kaisha Ltd, respectively. Raftilose® generally consists of chain lengths ranging from 2 to 9, with a mean chain length of approximately 4 or lower, with no terminal glucose unit occurring in the majority of the chains; Actilight® and Neosugar® have even shorter chains, mainly with terminal glucosyl, with a length ranging from 3 to 5, with a mean chain length of approximately 3.5.

In this connection it should be noted that Neosugar®, for example, is used in soft drinks on the Japanese market, but that the soft drinks in question, for the sake of the properties of Neosugar®, have a pH in the range from 5 to 7.

The fructans that can be used in the soft drinks, concentrates and syrups according to the invention are all (inulin-type) fructans in which the fructosyl units are linked mainly via a β-2,1 bond, and in which the chain length of the fructan is in the range from 3 to 100 units and both the modal and the mean chain length are each at least 4.75.

The invention can be applied in a relatively broad range of pH values, but the pH cannot be more than 4.0 (because the sweetening power of the soft drink, concentrate or syrup is then not sufficiently maintained, as a result of the gradual conversion of the fructan being too slight) nor less than 2.5 (because the dipeptide sweetener then.breaks down too quickly).

The chain length range (i.e. the difference in length between the longest and the shortest chains present) in the fructan should preferably be at least 10. In this way a better, more uniform spread of the breakdown reactions affecting the fructan is achieved, so that there is less chance of fluctuations in the sweetness level of the soft drink, concentrate or syrup.

Preferably, at least 90% of the bonds in the fructan is of the β-2,1 type, and the chain length of the fructan is in the range from 3 to 60 units.

Particularly good results are obtained when a terminal glucose unit occurs in at least 80% of the chains of the fructan.

More particularly, good results are obtained when the degree of branching of the chains in the fructan is less than 10% of the number of fructose units in the main chain, i.e. the DB is <0.1. The best results up to now have been obtained when the fructan is inulin, in particular when the fructan is inulin from chicory. Such products are commercially available, for example Frutafit® or Raftiline®, or can be obtained from a large number of plant species by methods known to the specialist. Inulin is also marketed under the brand name Fibruline®, from Cosucra.

Up to now only brief data on the hydrolysis of inulin have been published. Some information on acid hydrolysis of Fibruline® at 85° C. and a pH of 3.3 and 3.7 respectively (namely 3.5% and 10% in 2 hours) can be found in Table 6 on page 64 in H.C.I. Baal, "Functional properties and applications of inulin in food", which is a chapter in the "Proceedings of the Fourth Seminar on Inulin" (NRLO report No. 04/4; editor A. Fuchs), Wageningen, Netherlands, Oct. 26. 1993. No practical recommendation for the application of inulin in soft drinks can be derived from this, however. On the contrary, from the application of Neosugar®, for example, in soft drinks, etc., with a pH close to neutral, the impression is gained that fructans are unsuitable for application at lower pH values in a dilute aqueous medium. Experiments and sensory tests by the applicants have now shown that the loss of sweetening power by dipeptide sweeteners in soft drinks, when the storage period is at least three to six months, can be compensated for by the use of a suitable amount of an inulin-type fructan in the composition of the soft drink, without any adverse effects occurring insofar as off-flavours or after-tastes of the soft drink are concerned. It should also be noted that EP-A-0524484 describes powder mixtures and concentrates based on inulin for use in so-called low-calorie "instant drinks". This patent, however, does not give any information on the use of dipeptide sweeteners such as aspartame; furthermore, it is characteristic of "instant drinks" that they do not need to satisfy requirements with regard to storage stability because they are considered to be consumed almost immediately after preparation.

Inulin has also been recommended for some time as a unique and versatile food ingredient, inter alia for providing a desired texture or mouthfeel, for replacing fat or sugar in combination with intense sweeteners, as a bifidogenic ingredient (i.e. with a stimulating effect on the Bifidus flora which is naturally present in the human large intestine), or as a fibre supplement. However, even though flavour improvement is named as one of the advantages of the use of inulin in soft drinks, there is no information on the use of inulin together with aspartame and the favourable effect thereof in the context of the present invention. It is obvious that each or at least a number of the abovementioned extra advantages of the use of inulin will also be manifested when the combination of a dipeptide sweetener with inulin is used in soft drinks, concentrates and syrups according to the invention.

The dipeptide sweetener in the soft drink, concentrate or syrup is preferably aspartame, because optimum flavour quality is achieved with this substance.

The concentration of the dipeptide sweetener in a soft drink, concentrate or syrup will in general be chosen in such a way that the concentration in the soft drink (or in the final products for the consumer market to be made from the concentrates or syrups, as the case may be) will be in the 50–800 ppm range, in particular in the 100–600 ppm range, calculated as % by wt. of the ready-to-drink soft drink. The weight ratio between the dipeptide sweetener and the fructan in the soft drinks, concentrates and syrups according to the invention is generally in the range from approximately 1:20 to approximately 1:300. This ratio is not particularly critical, although the sweetness shelf-life of the soft drinks, concentrates and syrups will be proportionately longer as the relative amount of fructan increases. With the relatively higher amounts of fructan it is conceivable that the sweetness of the soft drink, etc., will at first even increase gradually, to a slight extent, for a few months during storage, without reaching an unacceptably high sweetness, before falling to the original level of sweetness again and gradually going past that level.

More particularly, the weight ratio between the dipeptide sweetener and the fructan is in the range from approximately 1:30 to approximately 1:150. This weight ratio is most preferably in the range from approximately 1:40 to approximately 1:100. By simple testing in accordance with the principle of this patent application the specialist can determine, for any soft drink etc. to be produced by him, what ratio between dipeptide sweetener and fructan (depending on the sweetener chosen and the fructan used) gives the best results insofar as sweetness shelf-life is concerned. In this connection it should be borne in mind, on the one hand, that the loss of sweetness by alitame will be somewhat slower than that by aspartame, so that somewhat different weight ratios will be used when alitame is chosen than when aspartame is chosen. On the other hand, it should also be noted that as the storage temperature of the soft drink, concentrate or syrup is increased, the amount of fructan needed relative to the dipeptide sweetener will generally decrease somewhat, but of course a shortening of the sweetness shelf-life will have to be accepted.

The invention also relates to methods of maintaining the sweetening power of soft drinks, concentrates or syrups sweetened with a dipeptide sweetener, during storage. According to these methods, a fructosyl saccharide which is a fructan in which (1) the fructosyl units are linked mainly via a β-2,1 bond,
(2) the chain length of the fructan is in the range from 3 to 100 units, and
(3) the modal and the mean chain length is each at least 4.75, is added to the soft drinks, concentrates or syrups sweetened with a dipeptide sweetener before the products are put into storage; and if necessary the pH of the soft drink, concentrate or syrup is adjusted to a value in the range from approximately 2.5 to approximately 4.0.

The chain length range in the fructan is preferably at least 10. It is also preferable that at least 90% of the bonds in the fructan are of the β-2,1 type and that the chain length of the fructan is in the range from 3 to 60 units. Particularly good results are obtained when a terminal glucose unit occurs in at least 80% of the chains of the fructan. More particularly, good results are obtained when the degree of branching of the chains in the fructan is less than 10% of the number of fructose units in the main chain. The best results up to now have been obtained when the fructan is inulin, in particular when the fructan is inulin from chicory. The dipeptide sweetener in these methods is preferably aspartame. The amount of fructan added is preferably such that the weight ratio between the dipeptide sweetener and the fructan is in the range from approximately 1:20 to approximately 1:300, more preferably in the range from approximately 1:30 to approximately 1:150, and most preferably in the range from approximately 1:40 to approximately 1:100.

The invention will hereinafter be explained by means of a test programme and comparative test programme carried out with a lemonade and some comparison lemonades. In these tests use was made of a trained taste panel of 12 people to determine the sweetness of the lemonade and comparison lemonades, expressed in sweetness equivalents (ES) determined at an evaluation temperature of the drinks of 20° C., and at various times during a period of storage at 20 and 300. The values for ES agree with the percentage by weight of sugar in a solution which is judged by the taste panel to be as sweet as the test solution.

The determination of the sweetness was carried out by so-called ranking tests, in which each sample to be judged is ranked in relation to a standard series of three sucrose lemonades with known sweetness (7.2, 8.0 and 8.8 ES, respectively). The ES values found according to the ranking tests can be regarded as significant. In the assessment of flavour, in triangle tests and paired comparisons, attention was also paid to mouthfeel and any off-flavours and/or after-tastes. The keeping quality test drinks were in each case also compared with a "freshly" prepared comparison lemonade with APM alone and no fructan according to the invention. In a triangle test three samples are offered, two of which are identical and one different; in a paired comparison two samples are compared with each other for one or more flavour characteristics.

In addition, the changes in contents of sweetening breakdown products, and also the content of APM, were determined by high-performance liquid chromatography (HPLC) at various times for the lemonades containing a fructan according to the invention, i.e. inulin, as well as the comparison lemonades. These values can be readily compared with stability tests made on inulin, in which the contents of breakdown products, notably fructose, glucose and disaccharides, were also determined by HPLC. In these stability tests, also, estimates were made of the number of sweetness equivalents. The stability tests, which were carried out as comparison examples (with fructans that are unsuitable for the purposes of the present invention), were made with Actilight® 950P, Raftilose® L95 and a levan subtilis obtained from Bacillus subtilis (which hereinafter, for the sake of convenience, will be referred to as "Levan subtilis").

Production of the lemonade and comparison lemonades; keeping auality tests and sensory/analytical determinations Standard lemonade syrups, A, B and C, were produced with the following composition:

|  | Syr. A or A' | Syr. B | Syr. C |
| --- | --- | --- | --- |
| aspartame (% by wt) | 0.312 | 0.338 | — |
| lemon flavour (% by wt) | 0.65 | 0.65 | 0.65 |
| sodium benzoate, 20% (% by wt) | 0.65 | 0.65 | 0.65 |
| citric acid/sodium citrate (buffer) (% by wt) | 1.67 | 1.67 | 1.67 |
| fructan (% by wt) | 0 or 16.25 | — | 16.25 |
| demineralized water: | made up to 100% by wt in each case | | |

In order to obtain the content of 16.25% by wt, the fructosyl saccharide used was in each case added to the lemonade syrup as a 10% solution in water before the dilution to lemonade or comparison lemonade was carried out.

The following were used as the fructosyl saccharide in the lemonades (according to the invention) and in the comparison lemonades:

Frutafit HD®, from Sensus (in Syr. A' and, for comparison purposes, in Syr. C),

Actilight® 950P

Raftilose® L95 and

Levan subtilis (the last three all in Syr. C).

These products differ as follows (according to analyses by the applicants):

Frutafit HD® is a fructan (inulin), with approximately 98% of the fructosyl units being linked via a β-2,1 bond, the chain length is between approximately 3 and approximately 60, with a modal chain length of 7 and a mean chain length of 16, with a terminal glucose unit occurring in more than 90% of the chains. The degree of branching is approximately 2%;

Actilight® 950P is a fructo-oligosaccharide (obtained by an enzymatic process), with more than 90% of the fructosyl units being linked via a β-2,1 bond, the chain length is between approximately 3 and approximately 5, with a modal chain length of 4 and a mean chain length of 3.6. A terminal glucose unit occurs in more than 90% of the chains;

Raftilose® L95 is a fructan (derived from inulin), with more than 90% of the fructosyl units being linked via a β-2,1 bond, the chain length is between approximately 2–3 and approximately 9, with a modal chain length of approximately 4.5 and a mean chain length of 4. A terminal glucose unit occurs in 20–40% of the chains, and the degree of branching is approximately 2%;

Levan subtilis is a levan, with the fructosyl units (94.6% by wt) and glucose units (4.2% by wt) being mainly linked via β-2,6 bonds, and with terminal glucose occurring in more than 95% of the chains. The chain length ranges from approximately 3 to more than 100, with a mean chain length of approximately 23 and a somewhat lower modal chain length. The degree of branching is approximately 3% (via β-2,1 bonds).

Lemonades and comparison lemonades with an ES value of approximately 8 were made directly from the above lemonade syrups by diluting 1 part of the syrup with 5.5 parts of demineralized water. If necessary, the pH was then adjusted to 3.2. The APM content of the drink obtained from Syr. A was thus 0.048% by wt (and 0.052% by wt from Syr. B). The inulin content of the drink obtained from Syr. A' was thus 2.5% by wt (the same as for the drink obtained from Syr. C).

The following lemonades (according to the invention) and comparison lemonades were thus obtained and used in keeping quality tests at the stated temperatures:

| Lemonade 1 | (from Syr. A'): | 20° C. |
| --- | --- | --- |
| Lemonade 2 and also | (from Syr. A'): | 30° C. |
| Comp. lemonade D | (from Syr. A): | 20° C. |
| Comp. lemonade D' | (from Syr. A): | 30° C. |
| Comp. lemonade E | (from Syr. B): | 20° C. |
| Comp. lemonade E' | (from Syr. B): | 30° C. |
| Comp. lemonade F | (from Syr. C): | 20° C. |
| Comp. lemonade F' | (from Syr. C): | 30° C. |
| Comp. lemonade G' | (from Syr. C with Actilight): | 30° C. |

-continued

| Comp. lemonade H' | (from Syr. C with Raftilose): | 30° C. |
| Comp. lemonade I' | (from Syr. C with Levan Subt.): | 30° C. |

The most important results are summarized in Tables I and II.

TABLE I

| | | | Content by analysis | | |
|---|---|---|---|---|---|
| T = 20° C. Drink | Time (in weeks) | Sweetness ES | APM (% by wt) | fructose (% by wt) | dissacch. (% by wt) |
| Lem. 1 | 0 | 8.4 | 0.048 | 0.06 | 0.12 |
| | 4 | 8.4 | 0.046 | 0.16 | 0.16 |
| | 8 | 8.3 | 0.044 | 0.28 | 0.19 |
| | 12 | 8.4 | 0.041 | 0.39 | 0.23 |
| | 16 | — | 0.038 | 0.53 | 0.26 |
| | 20 | 8.2 | 0.037 | 0.66 | 0.29 |
| | 24 | 8.5 | 0.034 | 0.79 | 0.31 |
| Comp. L. D. | 0 | 8.0 | 0.048 | — | — |
| | 4 | 7.7 | 0.046 | | |
| | 8 | 7.5 | 0.044 | | |
| | 12 | 6.9 | 0.041 | | |
| | 24 | 6.2 | 0.033 | | |
| Comp. L. E. | 0 | 8.3 | 0.052 | — | — |
| | 4 | — | 0.049 | | |
| | 8 | — | 0.047 | | |
| | 12 | 7.3 | 0.044 | | |
| | 24 | 6.2 | 0.034 | | |
| Comp. L. F. | 0 | 0.2 | — | 0.06 | 0.12 |
| | 4 | — | | 0.17 | 0.17 |
| | 8 | — | | 0.30 | 0.21 |
| | 12 | — | | 0.45 | 0.25 |
| | 24 | about 2 | | 0.92 | 0.33 |

TABLE II

| | | | Content by analysis | | |
|---|---|---|---|---|---|
| T = 30° C. Drink | Time (in weeks) | Sweetness ES | APM (% by wt) | fructose (% by wt) | dissacch. (% by wt) |
| Lem. 2 | 0 | 8.2 | 0.048 | 0.06 | 0.12 |
| | 4 | 8.6 | 0.040 | 0.54 | 0.24 |
| Comp L. D' | 0 | 8.0 | 0.048 | — | — |
| | 4 | 7.2 | 0.040 | | |
| Comp. L. E' | 0 | 8.3 | 0.052 | — | — |
| | 4 | 7.4 | 0.042 | | |
| Comp. L. F' | 0 | | — | 0.06 | 0.12 |
| | 4 | | | 0.68 | 0.27 |
| Comp. L. G' | 0 | | — | 0.04 | 0.05 |
| | 2 | | | 0.66 | 0.69 |
| | 4 | | | 1.06 | 0.86 |
| Comp. L. H' | 0 | | — | 0.01 | 0.15 |
| | 2 | | | 0.69 | 0.49 |
| | 4 | | | 1.06 | 0.55 |
| Comp. L. I' | 0 | | — | 0.03 | 0.03 |
| | 2 | | | 0.77 | 0.27 |
| | 4 | | | 1.50 | 0.31 |

From this table it can be clearly seen that the sweetness shelf-life of the drinks is considerably and significantly longer than that of drinks (e.g. soft drinks, concentrates and syrups) which only contain a dipeptide sweetener. There was no evidence of any adverse effects on mouthfeel, or of the occurrence of unwanted off-flavours or after-tastes.

Stability tests on 5% by wt inulin at pH=3.2 (and, for comparison purposes, on 5% by wt Actilight® 950P, Raftilose® L95 and Levan subtilis)

Stability tests were carried out over a period of 24 weeks at different temperatures (20–30–40° C.), starting from a 5% by wt solution of inulin (Frutafit HD®) in demineralized water, buffered with 0.175% by wt of citric anhydride/sodium citrate, pH=3.2, in the presence of 200 ppm of sodium benzoate as preservative. The comparative tests with Actilight® 950P, Raftilose® L95 and Levan subtilis were only carried out at 30° C., for a shorter period. The results are presented in Tables III (inulin) and IV (other substances) below, together with assessments of ES. In these tables "fruct." means fructose, "gluc." means glucose, "disacc." means the total amount of disaccharides, and "³DP3" means the total amount of saccharides with a chain length of 3 or more, with all these contents being expressed as percentages by weight.

TABLE III

| | WK 0 | WK 2 | WK 4 | WK 8 | WK 16 | WK 24 |
|---|---|---|---|---|---|---|
| Temp. = 20° C. | | | | | | |
| wt. % fruct. | 0.3 | 0.4 | 0.4 | 0.6 | 1.0 | 1.3 |
| wt. % gluc. | 0 | 0 | 0 | 0.1 | 0.2 | 0.2 |
| wt. % disacc. | 0.4 | 0.4 | 0.4 | 0.5 | 0.6 | 0.6 |
| ES | 0.7 | 1.0 | 1.0 | 1.2 | 1.9 | 2.4 |
| Temp. = 30° C. | | | | | | |
| wt. % fruct. | 0.3 | 0.6 | 1.0 | 1.8 | 3.2 | 4.0 |
| wt. % gluc. | 0 | 0.1 | 0.1 | 0.2 | 0.4 | 0.5 |
| wt. % disacc. | 0.4 | 0.4 | 0.4 | 0.6 | 0.7 | 0.6 |
| ES | 0.7 | 1.3 | 1.8 | 2.9 | 5.0 | 6.2 |
| Temp. = 40° C. | | | | | | |
| wt. % fruct. | 0.3 | 2.4 | 3.9 | 4.4 | 4.4 | 4.5 |
| wt. % gluc. | 0 | 0.2 | 0.4 | 0.5 | 0.6 | 0.6 |
| wt. % disacc. | 0.4 | 0.6 | 0.6 | 0.4 | 0.4 | 0.3 |
| ES | 0.7 | 3.9 | 5.9 | 6.5 | 6.5 | 6.5 |

TABLE IV

| | | WK 0 | WK 2 | WK 4 |
|---|---|---|---|---|
| Actilight | wt. % fruct. | 0.04 | 0.66 | 1.06 |
| | wt. % gluc. | 0.02 | 0.08 | 0.18 |
| | wt. % disacc. | 0.05 | 0.69 | 0.86 |
| | wt. % ≧ DP3 | 2.39 | 1.08 | 0.47 |
| Raftilose | wt. % fruct. | 0.01 | 0.69 | 1.06 |
| | wt. % gluc. | <0.01 | <0.03 | <0.06 |
| | wt. % disacc. | 0.15 | 0.49 | 0.55 |
| | wt. % ≧ DP3 | 2.37 | 1.38 | 1.0 |
| Levan subt. | wt. % fluct. | 0.03 | 0.77 | 1.5 |
| | wt. % gluc. | 0.02 | 0.04 | 0.05 |
| | wt. % disacc. | 0.03 | 0.27 | 0.31 |
| | wt. % ≧ DP3 | 2.35 | 1.53 | 0.75 |

From Table V, which is added below by way of conclusion, it can be seen that inulin (and with it any fructan such as is suitable for the purposes of the invention) shows a gradual breakdown of the higher saccharides. The corresponding breakdown in the case of the other fructans, which are unsuitable for the purposes of the invention, proceeds too quickly, so that the sweetness of soft drinks, concentrates and syrups sweetened with a dipeptide sweetener increases to an inadmissible degree during storage and it is therefore impossible to achieve a good sweetness shelf-life.

Table V also shows the contents of mono- plus disaccharides ("mono+di") and the total content of saccharides, including "mono +di" ("total sacch."), in each case expressed as percentages by weight. The ratio of "mono+di" to the total content of saccharides is also expressed, as the (m+d/tot.) ratio.

TABLE V

|  |  | WK 0 | WK 2 | WK 4 |
|---|---|---|---|---|
| Actilight | mono + di wt. % | 0.11 | 1.43 | 2.10 |
|  | total sacch. wt. % | 2.50 | 2.51 | 2.57 |
|  | ratio m+d/tot. | 0.04 | 0.57 | 0.82 |
| Raftilose | mono + di wt. % | 0.17 | 1.21 | 1.67 |
|  | total sacch. wt. % | 2.53 | 2.59 | 2.67 |
|  | ratio m+d/tot. | 0.07 | 0.47 | 0.63 |
| Levan Subt. | mono + di wt. % | 0.08 | 1.08 | 1.86 |
|  | total sacch. wt. % | 2.41 | 2.61 | 2.61 |
|  | ratio m+d/tot. | 0.03 | 0.41 | 0.71 |
| Inulin | mono + di wt. % | 0.19 | — | 0.97 |
|  | total sacch. wt. % | 2.47 | — | 2.47 |
|  | ratio m+d/tot. | 0.08 | — | 0.39 |

Statistical testing of the results has shown that lemonades according to the invention and comparison lemonades, although they do not differ significantly from each other at the start of the tests, already differ significantly from each other after four weeks insofar as their sweetness is concerned, while the sweetness of the lemonades according to the invention remains stable, even over a longer period. In the case of the lemonades according to the invention no essential or significant change and certainly no deterioration in the flavour can be found during the storage period when they are assessed for the criteria (1) acid, (2) fresh/lemon, (3) sour, (4) dry mouthfeel and (5) bitter after-taste.

We claim:

1. A soft drink, concentrate or syrup sweetened with a dipeptide sweetener and containing a fructosyl saccharide, wherein
   (a) the fructosyl saccharide is a fructan, with
      (1) the fructosyl units being linked for at least 80% via a $\beta$-2,1 bond;
      (2) the chain lengths in the fructan being in the range from 3 to 100 units; and
      (3) the modal and the mean chain lengths of the fructan each being at least 4.75 units; and
   (b) the pH of the soft drink, concentrate or syrup is in the range from approximately 2.5 to approximately 4.0; and
wherein the weight ratio between the dipeptide sweetener and the fructan is in the range from approximately 1:30 to approximately 1:150.

2. A soft drink, concentrate or syrup according to claim 1, wherein the breadth of the chain length range in the fructan is at least 10 units.

3. A soft drink, concentrate or syrup according to one of claims 1 or 2, wherein at least 90% of the bonds in the fructan are of the $\beta$-2,1 type and the chain lengths in fructan are in the range from 3 to 60 units.

4. A soft drink, concentrate or syrup according to one of claims 1 or 2, wherein a terminal glucose unit occurs in at least 80% of the chains of the fructan.

5. A soft drink, concentrate or syrup according to one of claims 1 or 2, wherein, the degree of branching of the chains in the fructan is less than 10% of the number of fructose units in the main chain.

6. A soft drink, concentrate or syrup according to one of claims 1 or 2, wherein the fructan is inulin.

7. A soft drink, concentrate or syrup according to claim 6, wherein the fructan is inulin from chicory.

8. A soft drink, concentrate or syrup according to one of claims 1 or 2, wherein the dipeptide sweetener is aspartame.

9. A soft drink, concentrate or syrup according to claim 1, wherein the dipeptide sweetener and the fructan are present in a weight ratio in the range from approximately 1:40 to approximately 1:100.

10. A method of maintaining the sweetening power of a soft drink, concentrate or syrup sweetened with a dipeptide sweetener, during storage, comprising:
    (a) adding a fructosyl saccharide which is a fructan wherein
       (1) the fructosyl units are linked for at least 80% via a $\beta$-2,1 bond;
       (2) the chain lengths of the fructan are in the range from 3 to 100 units; and
       (3) the modal and the mean chain lengths of the fructan are at least 4.75 units, to the soft drink, concentrate or syrup sweetened with a dipeptide sweetener;
    (b) adjusting the pH of the soft drink, concentrate or syrup to a value in the range from approximately 2.5 to approximately 4.0; and
    (c) storing said soft drink, concentrate or syrup.

11. A method according to claim 10, wherein the breadth of the chain length range in the fructan is at least 10 units.

12. A method according to claim 10 or 11 wherein at least 90% of the bonds in the fructan are of the $\beta$-2,1 type and the chain lengths in the fructan is in the range from 3 to 60 units.

13. A method according to claim 10 or 11, wherein at least 80% of the chains of the fructan contain a terminal glucose unit.

14. A method according to claim 10 or 11, wherein the degree of branching of the chains in the fructan is less than 10% of the number of fructose units in the main chain.

15. A method according to claim 10 or 11, wherein the fructan is inulin.

16. A method according to claim 15, wherein the fructan is inulin from chicory.

17. A method according to claim 10 or 11, wherein the dipeptide sweetener is aspartame.

18. A method according to claim 10 or 11, wherein the weight ratio between the dipeptide sweetener and the fructan is in the range from approximately 1:20 to approximately 1:300.

19. A method according to claim 18, wherein the dipeptide sweetener and the fructan are present in a weight ratio in the range from approximately 1:30 to approximately 1:150.

20. A method according to claim 10 or 11, wherein the dipeptide sweetener and the fructanare present in a weight ratio in the range from approximately 1:40 to approximately 1:100.

21. A soft drink, concentrate or syrup sweetened with a dipeptide sweetener as claimed in claim 1, wherein the sweetening power of the soft drink, concentrate or syrup remains substantially unchanged after storing said soft drink, concentrate or syrup at room temperature for a time period of at least 4 weeks.

22. A method of maintaining the sweetening power of a soft drink, concentrate or syrup sweetened with a dipeptide sweetener, during storage as claimed in claim 18, wherein said sweetening power remains substantially unchanged after storing said soft drink, concentrate or syrup at room temperature for a time period of at least 4 weeks.

23. A drink, concentrate or syrup sweetened with a dipeptide sweetener and containing a fructosyl saccharide, wherein (a) the fructosyl saccharide is a fructan, with
  (1) the fructosyl units being linked for at least 80% via a β-2,1 bond;
  (2) the chain lengths in the fructan being in the range from 3 to 100 units; and
  (3) the modal and the mean chain lengths of the fructan each being at least 4.75 units; and
(c) the pH of the drink, concentrate or syrup is in the range from approximately 2.5 to approximately 4.0; and
wherein said drink, concentrate, or syrup is selected from the group consisting of flavored soft drinks, soft drinks with fruit extracts, soft drinks with plant extracts, drinks containing tea extract, fruit nectars, fruit lemonade syrups, lemonade syrups with plant extract, and lemonade syrups with fruit flavor.

24. A drink, concentrate or syrup according to claim 23, wherein the breadth of the chain length range in the fructan is at least 10 units.

25. A drink, concentrate or syrup according to one of claims 23 or 24, wherein at least 90% of the bonds in the fructan are of the β-2,1 type and the chain lengths in fructan are in the range from 3 to 60 units.

26. A drink, concentrate or syrup according to one of claims 23 or 24, wherein a terminal glucose unit occurs in at least 80% of the chains of the fructan.

27. A drink, concentrate or syrup according to one of claims 23 or 24, wherein, the degree of branching of the chains in the fructan is less than 10% of the number of fructose units in the main chain.

28. A drink, concentrate or syrup according to one of claims 23 or 24, wherein the fructan is inulin.

29. A drink, concentrate or syrup according to claim 28, wherein the fructan is inulin from chicory.

30. A drink, concentrate or syrup according to one of claims 23 or 24, wherein the dipeptide sweetener is aspartame.

31. A drink, concentrate or syrup according to one of claims 23 or 24, wherein the dipeptide sweetener and the fructan are present in a weight ratio in the range from approximately 1:20 to approximately 1:300.

32. A drink, concentrate or syrup according to claim 31, wherein the weight ratio between the dipeptide sweetener and the fructan is in the range from approximately 1:30 to approximately 1:150.

33. A drink, concentrate or syrup according to claim 32, wherein the dipeptide sweetener and the fructan are present in a weight ratio in the range from approximately 1:40 to approximately 1:100.

34. A drink, concentrate or syrup sweetened with a dipeptide sweetener as claimed in claim 31, wherein the sweetening power of the drink, concentrate or syrup remains substantially unchanged after storing said drink, concentrate or syrup at room temperature for a time period of at least 4 weeks.

* * * * *